(12) United States Patent
Konno

(10) Patent No.: US 6,796,917 B2
(45) Date of Patent: Sep. 28, 2004

(54) SLIDING CONTACT GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 99 days.

(21) Appl. No.: 10/237,651

(22) Filed: Sep. 9, 2002

(65) Prior Publication Data

US 2003/0064843 A1 Apr. 3, 2003

(30) Foreign Application Priority Data

Oct. 2, 2001 (JP) .................................... 2001-306846

(51) Int. Cl.$^7$ ................................................ F16H 7/08
(52) U.S. Cl. ..................................... 474/111; 474/140
(58) Field of Search ................................. 474/111, 140

(56) References Cited

U.S. PATENT DOCUMENTS 4,826,468 A * 5/1989 Friedrichs ................... 474/140
5,776,024 A * 7/1998 White et al. ................ 474/111
6,036,613 A * 3/2000 Diehm ........................ 474/111

FOREIGN PATENT DOCUMENTS

| JP | 2000-346154 A | 12/2000 |
| JP | 2002-266964   | 9/2002  |

* cited by examiner

Primary Examiner—Thomas R. Hannon
(74) Attorney, Agent, or Firm—Howson and Howson

(57) ABSTRACT

A guide for a transmission chain, belt or the like includes a synthetic resin shoe having a sliding surface, a synthetic resin plate portion integrally molded on the back side of the shoe, and a plate which reinforces the guide body fitting into a longitudinal slot in the plate portion. The reinforcing plate is provided with punched windows, open in the direction of the plate thickness, and a through hole, aligned with a guide body mounting hole provided on an end portion of the guide. The total weight of the guide is reduced, and, even if the thermal expansion coefficients of the guide body and reinforcing plate differ, deformation of the guide and breakage of the guide can be prevented.

2 Claims, 7 Drawing Sheets

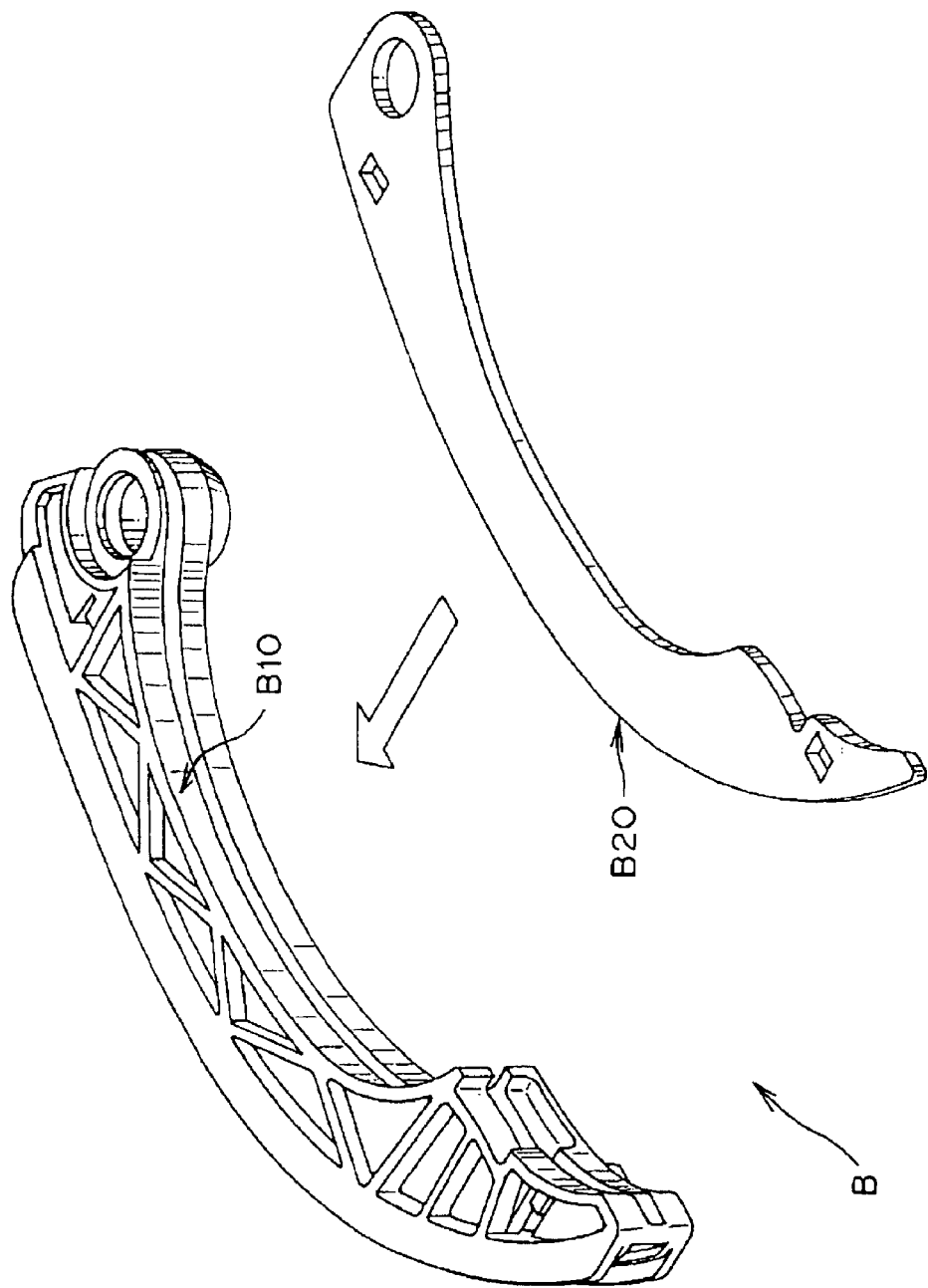

SLIDING CONTACT GUIDE FOR TRANSMISSION DEVICE

FIELD OF THE INVENTION

This invention relates to a sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, a chain or belt transmission device for valve timing in an internal combustion engine, or for transmitting rotational power in another drive mechanism, includes a pivotally mounted, movable sliding contact guide, which cooperates with a tensioner, and a fixed sliding contact guide. The movable guide and the fixed guide are attached to the body of the engine or other drive mechanism by bolts, pins, or similar mountings. The guides provide suitable tension by making sliding contact with the chain or belt, and also prevent vibrations of the chain or belt both in the plane of its traveling path (which is usually vertical), and in the transverse direction.

As shown in FIG. 6, a conventional movable sliding contact guide A (also referred to as a "tensioner lever") is a two-piece structure comprising a shoe A10 composed of resin material for sliding contact with a chain, and also a die cast aluminum base member A20, the aluminum providing sufficient strength for holding and retaining the form of the shoe A10. This guide is the subject of Japanese Laid-open Patent Publication No. 346154/2000.

FIG. 7 shows another movable sliding contact guide or tensioner lever B, which takes the form of a two-piece structure comprising a shoe B10 composed of a resin material and a steel plate B20, which is required for strength and for holding and retaining the form of the shoe B10. This guide is the subject of Japanese Patent Application No. 69238/2001.

In the above-mentioned movable, sliding contact guides, various properties such as contact sliding properties, wear properties, mechanical strength and the like, are made compatible by selecting appropriate materials for the respective members of the two-piece structure, taking into account that the shoe requires good sliding properties and wear resistance, and the base or plate require good mechanical strength in order to retain the shoe.

Known movable type sliding contact guides are subject to several problems. The die cast aluminum base member A20 of the guide shown in FIG. 6, has relatively low strength. Thus, it needs to have a large volume and a large wall thickness to ensure rigidity. Accordingly this structure is not suitable for a guide in which weight reduction is desired. Moreover, material costs, and production costs, including molding costs, are high. Another problem is that assembly is troublesome, especially the operation by which hooks A11 are used to secure the base member A20 to the shoe A10. In the movable sliding contact guide B, as shown in FIG. 7, since the plate B20 is made of steel, in order to provide the strength required to hold the shoe B10, even if the plate is in the form of a thin sheet, the overall weight of the guide is relatively large, as in the case of the guide of FIG. 6, which utilizes a die cast aluminum base member.

Accordingly, the objects of the invention are to solve the above-mentioned problems encountered in prior art sliding contact guides, and to provide a sliding contact guide in which an overall weight reduction is achieved, and vibration noises, the energy of which increases with increasing weight, are suppressed.

SUMMARY OF THE INVENTION

In order to achieve the above objects, a sliding contact guide in accordance with the invention comprises an elongated shoe composed of synthetic resin. The shoe has front and back sides, and a surface extending longitudinally on the front side for sliding contact with an endless, circulating, flexible power transmission medium such as a chain or belt. An elongated plate-receiving portion, also composed of synthetic resin, integrally molded with the shoe on the back side, extends longitudinally along the back side of the shoe, and has a longitudinally extending slot. The slot has opposed walls disposed in perpendicular relation to said surface. A body mounting hole extends through the plate-receiving portion adjacent one end of the guide and intersects the slot. A reinforcing plate, for reinforcing the guide, fits in the slot and has opposite faces engaged respectively with the opposed walls of the slot. The plate also has a through hole in register with the body mounting hole. The guide is characterized by punched windows extending through the plate in the direction of its thickness, the windows being distributed along the length of the plate.

The synthetic resin forming the guide body in accordance with the invention is not particularly limited, but preferred materials are superior in wear resistance, and have lubricating properties suitable for a sliding shoe surface in contact with a chain, belt or the like. Suitable synthetic resins include, for example, nylon 6, nylon 66, nylon 46, all aromatic nylons and the like. So-called engineering plastics are preferably used, and, where superior strength is required, fiber-reinforced plastics are preferred.

The material of the reinforcing plate is likewise not particularly limited. However, non-ferrous metals such as aluminum, magnesium, titanium and the like, and engineering plastics, fiber-reinforcing plastics and the like, having improved bending rigidity and strength, are preferably used.

The windows punched in the reinforcing plate portion to reduce the weight of the plate may have any shape such as rectangular, circular or the like. Furthermore, the reinforcing plate may have larger wall thickness in a portion of the plate requiring strength, and a smaller wall thickness in another portion of the plate requiring less strength.

The punched windows may be disposed in any of a variety of arrangements, for example, a staggered arrangement, provided that the windows are distributed along the longitudinal direction of the guide.

The sliding contact guide in accordance with the invention, having the above-described configuration, produces the following beneficial effects.

First, the sliding contact guide imparts appropriate tension to a traveling, flexible transmission medium disposed in an endless loop, such as a chain, belt or the like, and suppresses both vibrations in the plane of travel of the medium (usually vertical and therefore referred to as "vertical vibrations"), and transverse vibrations.

Further, since the reinforcing plate is provided with punched windows, which are open in the direction of the plate thickness, and distributed in the longitudinal direction of the guide, a significant weight reduction is achieved, and consequently the vibration energy of the guide, generated as a result of vertical vibration and transverse vibration of the flexible transmission medium, are reduced.

Since a through hole, provided in the plate at least at one end portion thereof, is fastened on a mounting bolt, pin, or the like, together with the body mounting hole of the guide body 10, vibrations between the guide body and the reinforcing plate, generated due to the traveling of the flexible power transmission medium, are also suppressed.

An example of a preferred embodiment of a sliding contact guide for a transmission device according to the invention will be described below with reference to the drawings.

BRIEF DESCRIPTION OF THE DRAWINGS

FIG. 7 is an exploded view of another conventional movable guide.

DETAILED DESCRIPTION OF THE PREFERRED EMBODIMENTS

Figure 1:
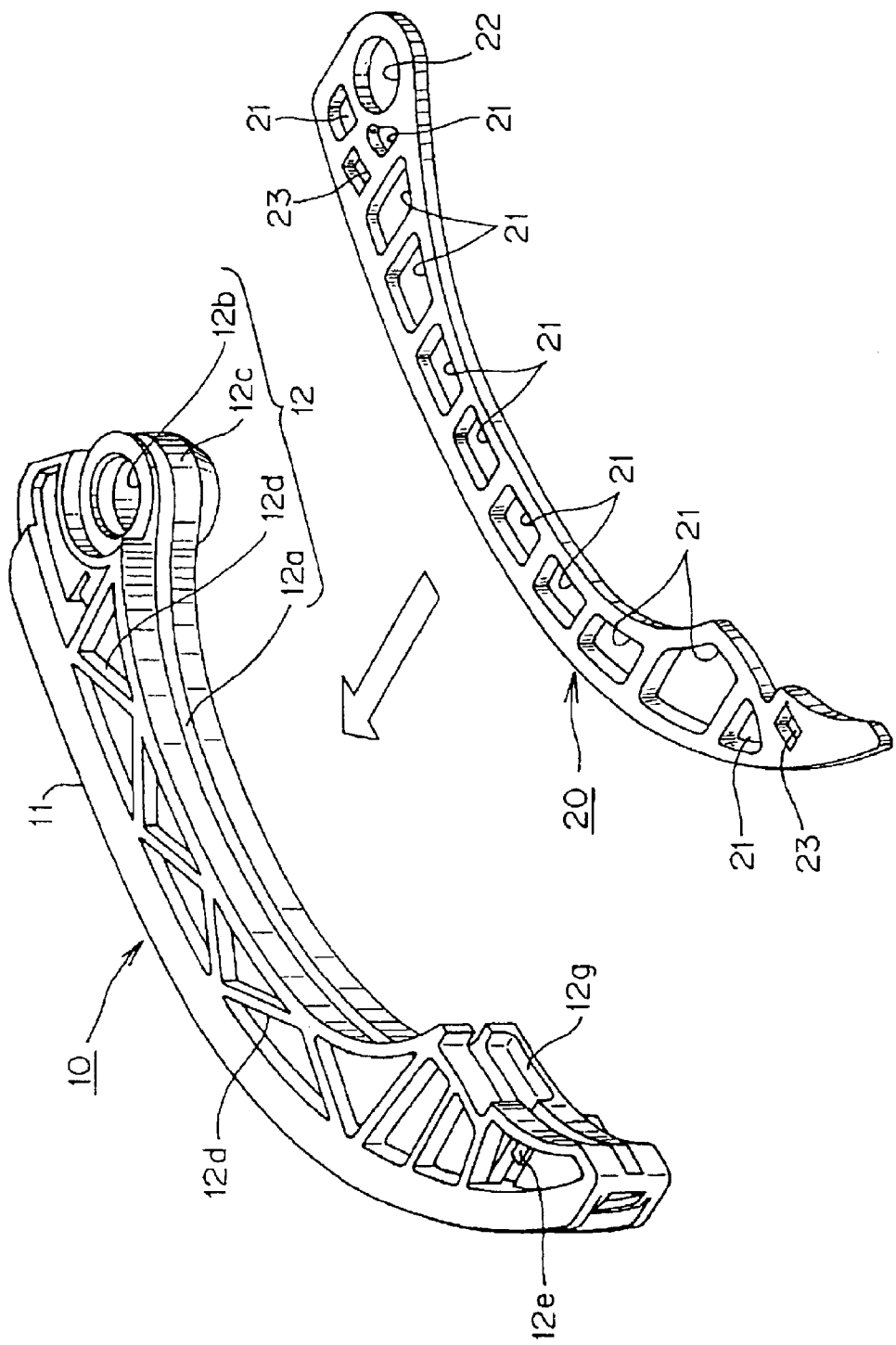
FIG. 1 is an exploded view of a movable guide for a transmission device in accordance with a first embodiment of the invention.
Figure 2:
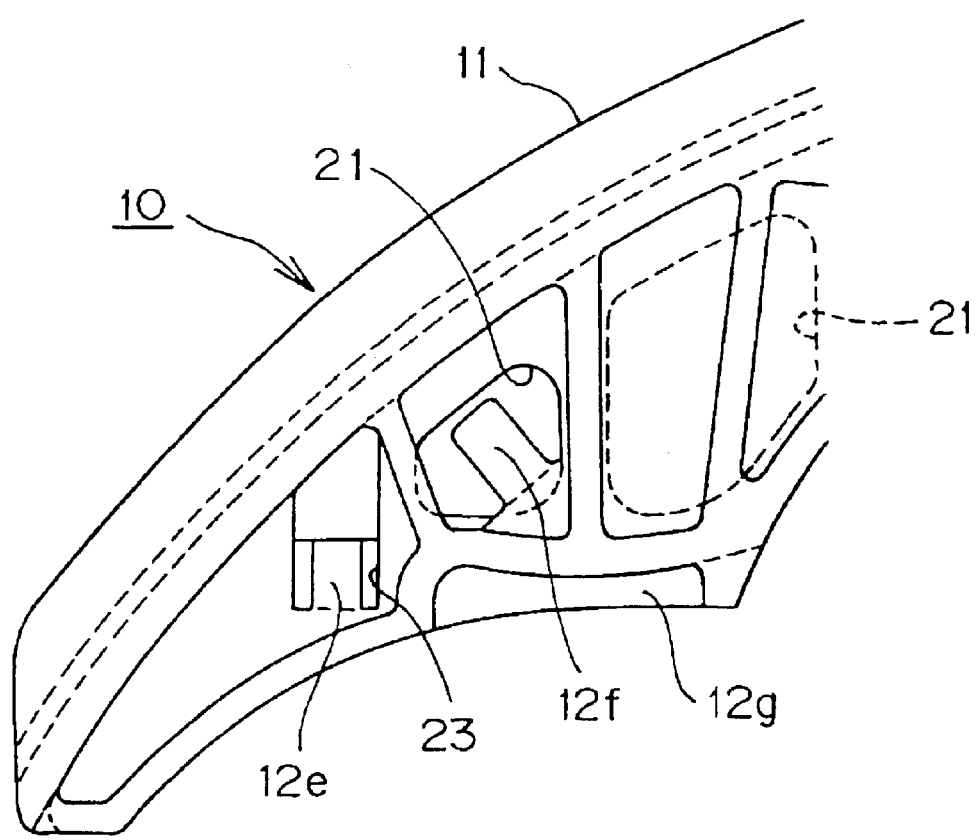
FIG. 2 is a fragmentary elevational view of the distal end portion of the guide of FIG. 1.
Figure 3:
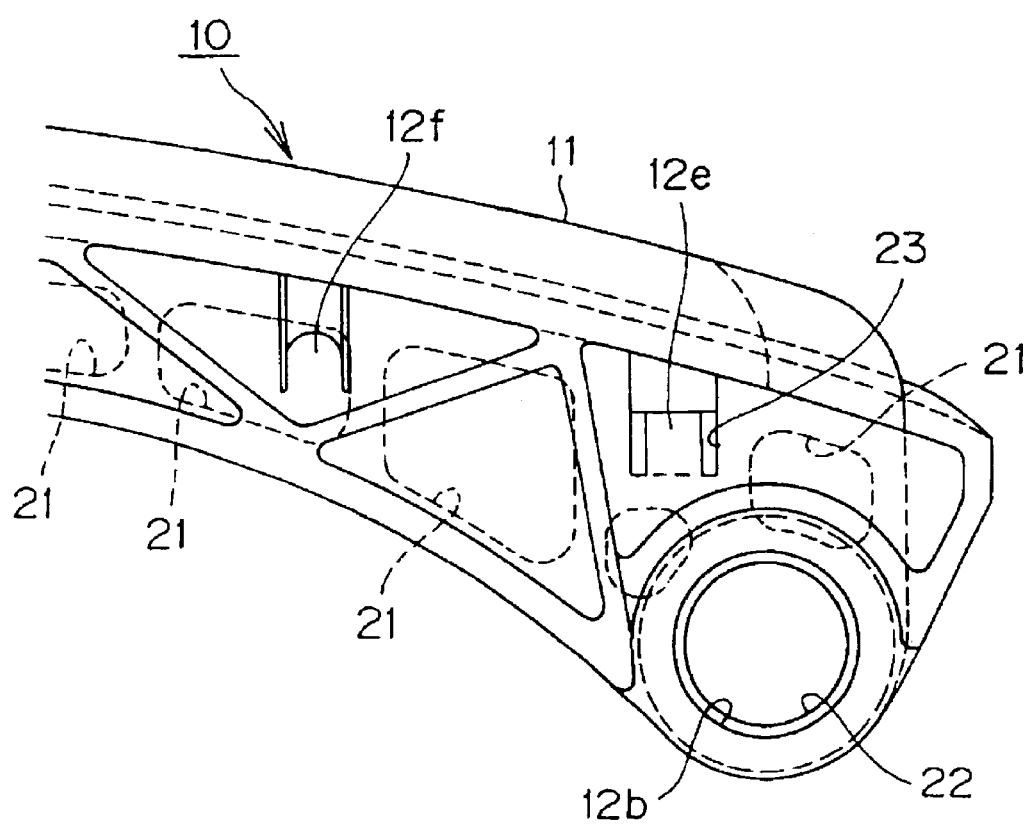
FIG. 3 is a fragmentary elevational view of the proximal end portion of the guide of FIG. 1.

The movable guide shown in FIGS. 1–3 is a two-piece structure consisting of a guide body 10, integrally molded from a synthetic resin, and a reinforcing plate 20 punched from a steel sheet. The two-piece structure, in which the plate 20 reinforces the guide body 10, is obtained by inserting the reinforcing plate 20 into the guide body 10 in the direction of the arrow in FIG. 1.

The guide body 10 comprises a shoe 11 having, on its front portion, a sliding surface on which a chain or other circulating, flexible, power transmission medium slides, and a plate-receiving portion 12 on the back side of the shoe portion 11. The plate-receiving portion 12, will ordinarily be generally vertical, since it is disposed in perpendicular relation to the sliding surface, and extends along the longitudinal direction of the guide. The plate-receiving portion 12 includes a slot 12a, which is open along the longitudinal direction of the guide. The plate-receiving portion also includes a boss 12c, having a mounting hole 12b for mounting on a body such as an engine housing, a drive mechanism housing or the like. Ribs 12d, also formed in the plate-receiving portion, reinforce the synthetic resin guide structure. The guide also has a tensioner contacting portion 12g, near the end opposite the end at which the mounting hole 12 be is located.

The reinforcing plate 20 can be easily engaged with the guide body 10 by fitting the reinforcing plate 20 into the slot 12a on the side of the shoe portion 11 opposite the side on which the sliding surface is located. Thus, the guide can be assembled easily, and automation of the assembly process is possible. When the reinforcing plate 20 is fitted into the slot 12a in the plate-receiving portion 12, the reinforcing portion 20 extends along the longitudinal direction of the guide, i.e., along the direction in which the portion of the flexible transmission medium in sliding engagement with the shoe travels. Thus, the guide has improved bending rigidity and high strength, comparable to that of a conventional die cast aluminum movable guide.

The reinforcing plate 20, which is fitted into the slot 12a to reinforce the guide body, includes a plurality of punched rectangular windows 21, open in direction of the plate thickness, and distributed along the longitudinal direction of the guide. The plate 20 also has a through hole 22, which is in register with the body mounting hole 12b of the guide body 10, and locking holes 23 engageable with locking pawls 12e of the guide body 10.

Compared with a conventional non-punched reinforcing plate having the same profile, a punched reinforcing plate in accordance with the invention, as shown in FIG. 1, has achieved a weight reduction of approximately 58 g. Compared with a conventional die cast aluminum plate, a weight reduction of approximately 14 g was achieved.

As shown in FIGS. 2 and 3, the locking pawls 12e, provided on the plate-receiving portion 12 are detachably locked to the locking holes 23 in the reinforcing plate 20. Furthermore, locking pieces 12f, which are parts of the plate-receiving portion 12 of the guide body 10, are disposed in locking relationship with selected punched windows 21 of the reinforcing plate 20. These locking pieces 12f can be locked to their corresponding punched rectangular windows 21, thereby increasing the strength of the connection between the guide body 10 and the reinforcing plate 20.

The guide in accordance with the invention, which has a reduced the total weight compared to that of a conventional guide, can be attached to a side wall of an engine, a drive mechanism, or the like, by means of a mounting bolt (not shown) in such a way that the bolt extends through the body mounting hole 12b in the guide body, and through the hole 22 in the reinforcing plate, thereby fastening both the guide body 10 and the reinforcing plate 20 to the engine or drive mechanism and also assisting in securing the reinforcing plate to the guide body.

The guide body 10 and the reinforcing plate 20 are prevented from being dislodged by the mounting bolt at the proximal end of the guide, and cannot be dislodged by the pressing force exerted by the plunger of a tensioner (not shown) at the distal end of the guide. Thus, vertical and transverse vibrations, which occur in the circulating flexible power transmission medium are suppressed, and stable circulation of the medium is ensured.

Figure 4:
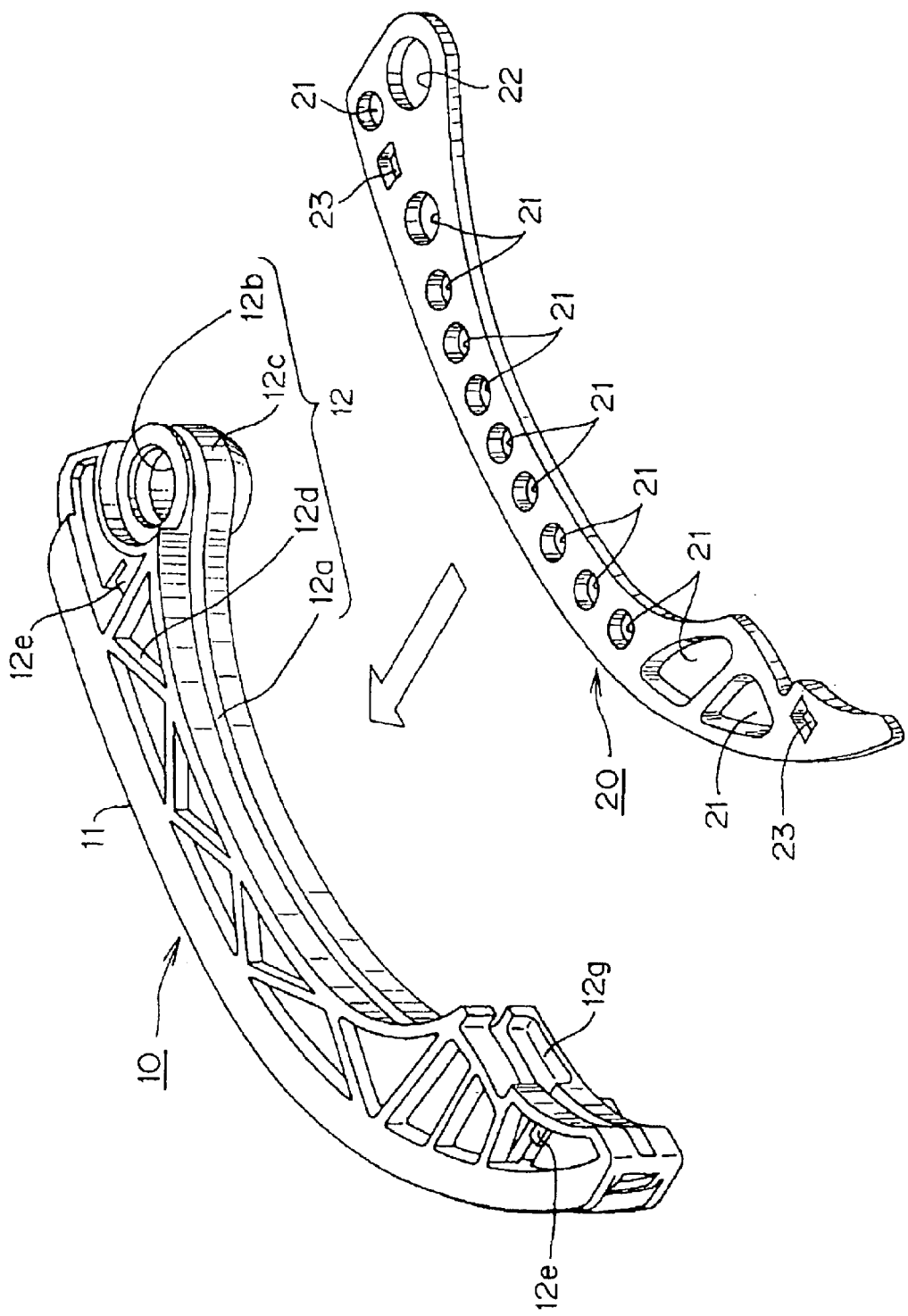
FIG. 4 is an exploded view of a movable guide according to a second embodiment of the invention.

Further, in disassembly of the movable guide for recycling, the guide body 10 and the reinforcing plate 20 can be separated easily by pressing the locking pawls 12e and the locking pieces 12f outward, by a tool such as a screwdriver, to release the engagement between the pawls and the edges of 23 and to release the engagement between the locking pieces and the edges of the windows 21 with which they are engaged. In the second embodiment of the invention, as illustrated in FIG. 4, as in the first embodiment, the movable guide is a two-piece structure comprising a guide body 10 integrally molded of synthetic resin and a reinforcing plate 20 punched from a steel sheet, the reinforcing plate being inserted into the guide body 10 in a direction of the arrow to reinforce the guide body.

The guide of the second embodiment has a structure similar to the guide of the first embodiment. The guide body 10 comprises a shoe 11 having a sliding surface, and a plate-receiving portion 12 on the back side of the shoe portion 11. The plate-receiving portion 12 has a slot 12a open along its length, and a boss 12c, having a body mounting hole 12b, for mounting on a body such as an engine, a drive mechanism or the like. Ribs 12d are provided on the guide body 10 to reinforce the synthetic resin guide structure. A through hole 22, is in register with the body mounting hole 12b of the guide body 10, and locking holes 23 are engaged with locking pawls 12e of the guide body 10.

On the other hand, the reinforcing plate 20, which is fitted into the slot 12a, includes a plurality of punched, circular windows 21, open in the direction of plate thickness, and distributed along the longitudinal direction of the guide.

In summary the in the second example, instead of punched rectangular windows, as in the first embodiment, in the second embodiment, the windows 21 are circular.

Figure 5:
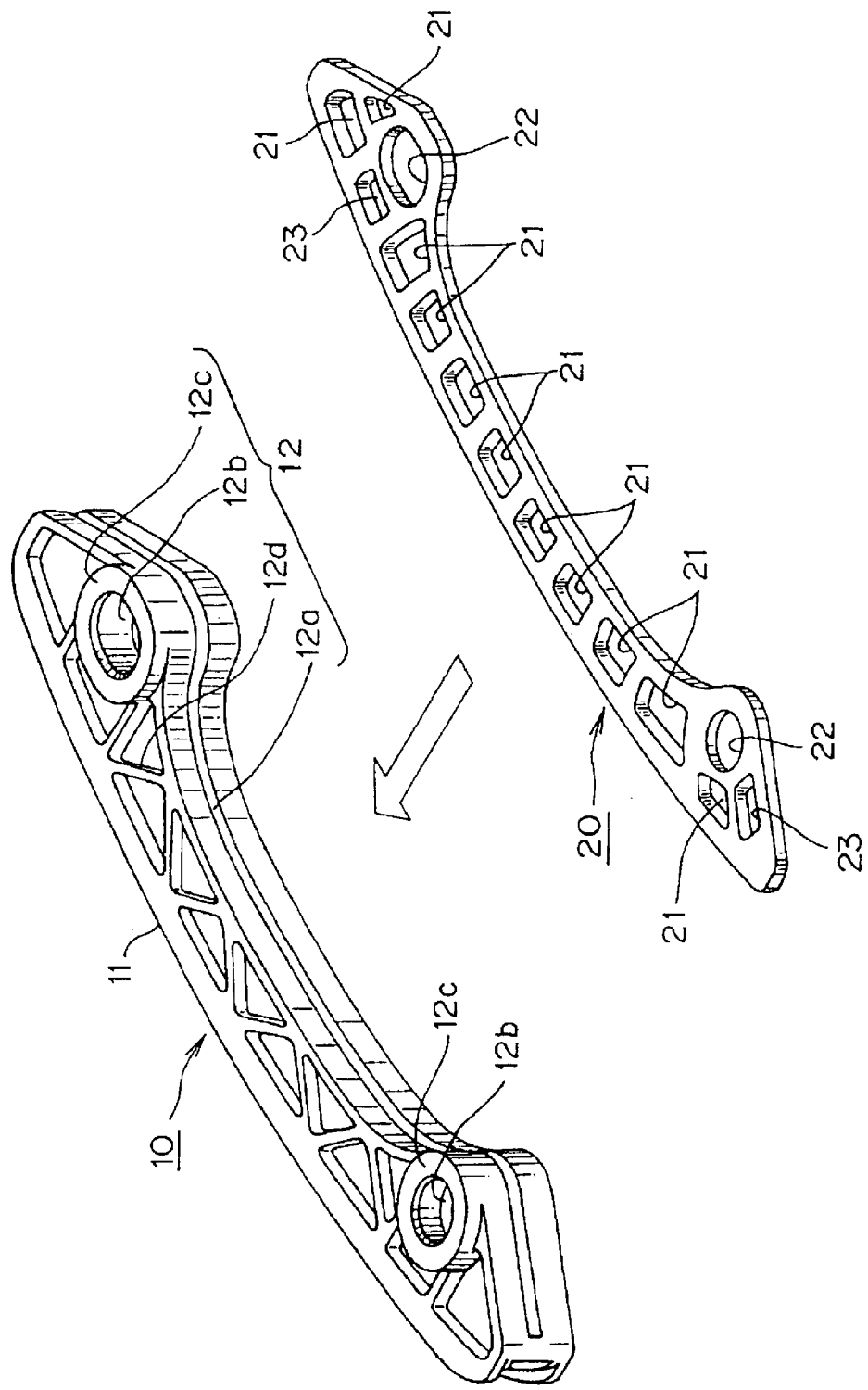
FIG. 5 is an exploded view of a fixed guide according to a third embodiment of the invention.
Figure 6:
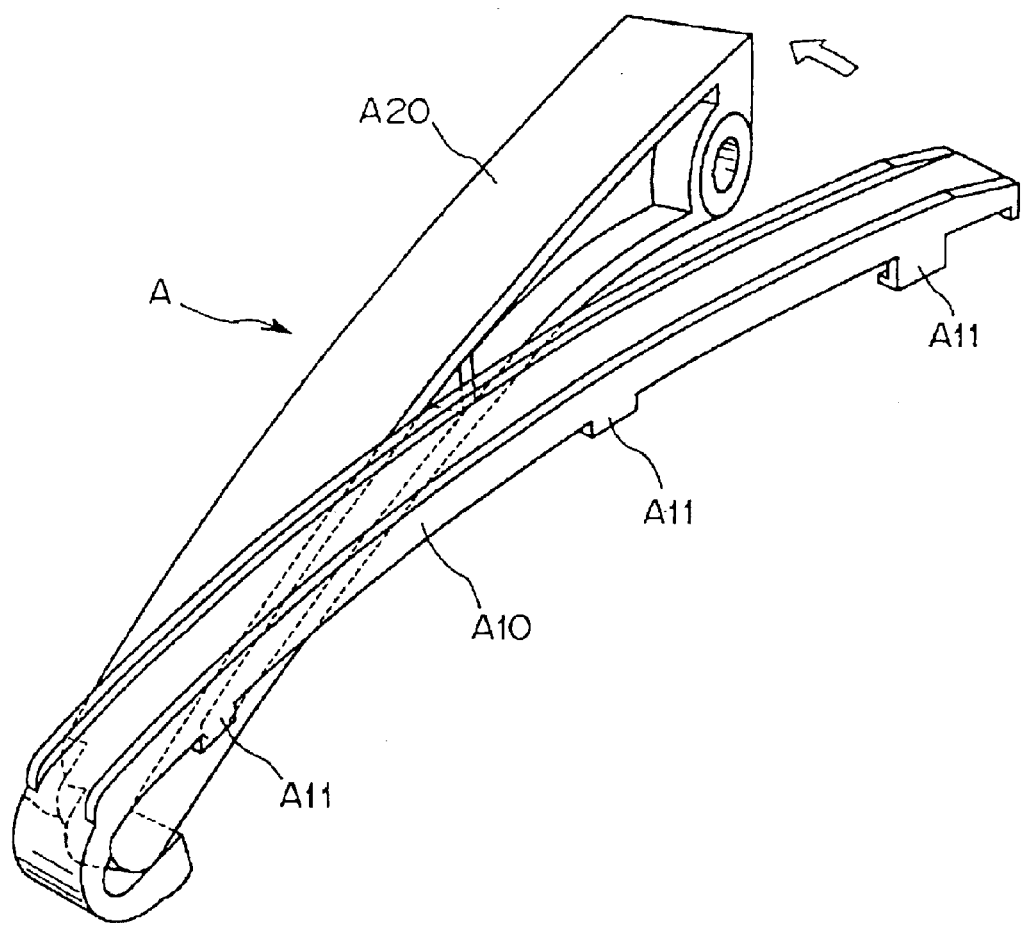
FIG. 6 is an exploded view of a conventional die cast aluminum, movable sliding contact guide.

The first and second embodiments are examples of pivotally movable sliding contact guides. FIG. 5 illustrates an embodiment of the invention designed for use as a fixed sliding contact guide. As in the above-described first and second embodiments, the fixed guide of FIG. 5 is a two-piece structure comprising a guide body 10 integrally molded of synthetic resin and a reinforcing plate 20 punched from a steel sheet. The reinforcing plate 20 is inserted into the guide body 10 in a direction of the arrow, to reinforce the guide body.

The guide of the third embodiment has a structure similar to that of the first and second embodiments in that the guide body 10 comprises a shoe 11 having a sliding surface for sliding contact with a circulating, flexible, power transmission medium, and a plate-receiving portion 12 on the side of the shoe 11 opposite to side on which the sliding surface is located. The plate-receiving portion extends along the longitudinal direction of the guide, and includes a slot 12a, open along the longitudinal direction of the guide, and bosses 12c adjacent both ends of the guide, each boss having a body mounting hole 12b for mounting on a body such as an engine, a drive mechanism or the like. Multiple reinforcing ribs 12d are provided to reinforce the synthetic resin guide structure. The reinforcing plate 20 is fitted into the slot 12a on the side of the shoe 11 opposite to the sliding surface. The reinforcing plate 20 has a plurality of punched rectangular windows 21, open in the direction of the plate thickness and distributed along the longitudinal direction of the guide. Through holes 22 are provided adjacent both ends of the reinforcing plate 20, and, when the reinforcing plate and guide body are assembled, each of the through holes 22 is in register with one of the body mounting holes 12b for mounting on mounting bolts. Locking holes 23 in the plate are engaged with locking pawls (not shown) in the guide body 10.

The fixed guide of FIG. 5 according to the invention is reduced in weight by virtue of the punched windows in the reinforcing plate.

The benefits of the sliding contact guide in accordance with the invention may be summarized as follows.

First, the sliding contact guide imparts appropriate tension to a chain, belt or the like, and suppresses both vertical vibrations and transverse vibrations. As a result, stable operation of the chain, belt or the like is ensured.

The punched windows in the reinforcing plates achieve a significant weight reduction, reducing the magnitude of the vibration energy in the guide, generated as a result of vertical vibration and transverse vibrations of the chain, belt or the like.

Since a through hole, provided in the plate at least at one end portion thereof, is fastened on a mounting bolt, pin, or the like, together with the body mounting hole of the guide body, vibrations between the guide body and the reinforcing plate, are suppressed, and noises resulting from these vibrations are also suppressed.

I claim:

1. A sliding contact guide for a transmission device comprising an elongated shoe composed of synthetic resin, the shoe having front and back sides and a surface extending longitudinally on said front side for sliding contact with a flexible power transmission medium, and an elongated plate-receiving portion, also composed of synthetic resin, integrally molded with said shoe on said back side, the plate receiving portion extending longitudinally along the back side of the shoe and having a longitudinally extending slot, the slot having opposed walls disposed in perpendicular relation to said surface, a body mounting hole extending through the plate-receiving portion adjacent one end of the guide and intersecting said slot, an elongated reinforcing plate, for reinforcing the guide, the plate having opposite ends spaced from each other along the direction of elongation of the plate, said plate fitting in said slot and having opposite faces engaged respectively with said opposed walls of the slot, a through hole in register with said body mounting hole, locking holes extending through the plate adjacent said opposite ends thereof, each of said locking holes receiving a locking pawl extending from said plate receiving portion, whereby said reinforcing plate is held in said slot of the plate-receiving portion, punched windows extending through said plate in the direction of its thickness, the windows being distributed along the length of the plate, and at least one locking member extending from said plate-receiving portion and received in locking relationship by one of said windows.

2. A sliding contact guide according to claim 1, having plural locking members extending from said plate-receiving portion, each of said plural locking members being received in locking relationship by a different one of said windows.

* * * * *